US009614561B2

(12) United States Patent
Bartels et al.

(10) Patent No.: US 9,614,561 B2
(45) Date of Patent: Apr. 4, 2017

(54) METHOD AND APPARATUS FOR MITIGATING RADIO FREQUENCY INTERFERENCE (RFI) IN A PORTABLE ELECTRONIC DEVICE WHILE CONSERVING BATTERY POWER

(71) Applicant: MOTOROLA SOLUTIONS, INC, Schaumburg, IL (US)

(72) Inventors: Peter J. Bartels, Loxahatchee, FL (US); Javier Alfaro, Miami, FL (US); Stanko Jelavic, Davie, FL (US); Graeme Peter Johnson, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/068,225

(22) Filed: Oct. 31, 2013

(65) Prior Publication Data

US 2015/0118986 A1 Apr. 30, 2015

(51) Int. Cl.
*H04B 1/12* (2006.01)
*H04W 52/02* (2009.01)
*H04B 1/10* (2006.01)
*H04B 15/00* (2006.01)

(52) U.S. Cl.
CPC .................. *H04B 1/12* (2013.01); *H04B 1/10* (2013.01); *H04B 15/00* (2013.01); *H04W 52/0209* (2013.01); *H04W 52/0238* (2013.01)

(58) Field of Classification Search
CPC ........ H04B 1/24; H04B 15/00; H04B 1/0475; H04B 15/04; H04L 12/5695; H04W 52/0209; H04W 52/0225; H04W 52/0238; H04W 52/0251; H04W 52/0245
See application file for complete search history.

(56) References Cited

U.S. PATENT DOCUMENTS

| | | | |
|---|---|---|---|
| 5,765,113 A | 6/1998 | Russo et al. | |
| 5,877,630 A | 3/1999 | Kraz | |
| 6,760,671 B1 | 7/2004 | Batcher | |
| 7,324,496 B1 * | 1/2008 | Sooch et al. | 370/345 |
| 7,643,965 B2 | 1/2010 | Zhang | |
| 7,693,493 B2 * | 4/2010 | Chiu et al. | 455/73 |

(Continued)

FOREIGN PATENT DOCUMENTS

| | | |
|---|---|---|
| EP | 1460803 B1 | 9/2012 |
| EP | 5652256 B1 | 10/2012 |

OTHER PUBLICATIONS

PCT International Search Report Dated Jan. 23, 2015 for Counterpart Application PCT/US2014/061317.

(Continued)

*Primary Examiner* — Devan Sandiford
(74) *Attorney, Agent, or Firm* — Barbara R. Doutre; Scott M. Garrett

(57) ABSTRACT

A method and circuit for mitigating RFI in an electronic device that occurs while the device is in a low power mode utilizes one or more antenna elements in the device to receive RF energy. When the RF energy is sufficiently high that it could affect signal states in the device while in the low power mode, the device transitions from the low power mode to an active mode and begins an RFI mitigation process to ensure signal states and other circuit operations in the device are not changed by the RFI.

36 Claims, 3 Drawing Sheets

(56) References Cited

U.S. PATENT DOCUMENTS

| | | |
|---|---|---|
| 8,156,359 B1 * | 4/2012 | Sedarat et al. ............... 713/320 |
| 8,290,100 B2 | 10/2012 | Komninakis et al. |
| 2004/0058645 A1 * | 3/2004 | Brenner .................. G01S 19/21 455/11.1 |
| 2004/0185860 A1 * | 9/2004 | Marjelund et al. ........... 455/450 |
| 2004/0229590 A1 * | 11/2004 | Kubo ................ H04W 52/0238 455/307 |
| 2009/0275302 A1 * | 11/2009 | Huston et al. ............... 455/231 |
| 2011/0121865 A1 | 5/2011 | Olmos et al. |
| 2013/0084818 A1 * | 4/2013 | Croman ............ H04W 52/0245 455/226.1 |
| 2014/0273901 A1 * | 9/2014 | Liu .................. H04W 52/0238 455/226.1 |

OTHER PUBLICATIONS

Wikipedia, the Free encyclopedia, Electromagnetic Interference, downloaded from internet—Jul. 8, 2016, all pages.

\* cited by examiner ns. Accordingly, there is a need for a method and apparatus for maintaining signal states in an electronic device that is subject to occasional radio frequency interference without the problems associated with the prior art.
METHOD AND APPARATUS FOR MITIGATING RADIO FREQUENCY INTERFERENCE (RFI) IN A PORTABLE ELECTRONIC DEVICE WHILE CONSERVING BATTERY POWER

FIELD OF THE DISCLOSURE

The present disclosure relates generally to electronic devices operating under the effect of interfering radio frequency signals, and more particularly to electronic devices that employ active radio frequency interference mitigation techniques.

BACKGROUND

Electromagnetic compatibility is a substantial concern in the design of many electronic devices. Typically, the concern is with preventing radiated and/or conducted emissions generated by a device from exceeding levels prescribed by governmental regulation. Sources of such emissions include, for example, switching power supplies, video signals, clock signals, and other fast transitioning or high frequency signal sources. These sources, however, are considered unintentional radiators, and while they can cause interference with other nearby (or on a common power line in the case of conducted emissions), the signal strength is relatively weak compared to intentional radiators such as radio transmitters.

While considerable effort is taken to ensure that intentional radiating devices operate such that their signals conform to prescribed parameters, a problem arises for devices in close proximity to intentional radiators. The near field can couple into the circuits of nearby electronic devices and interfere with their operation. This includes devices that are substantially identical to the transmitting device. Radio signals can couple into circuitry in nearby devices, inducing voltage and/or current that can interfere with the operation of those circuits. This effect is especially noticed in devices that have data lines and do not constantly refresh data among various components, such as when the device is in a low power state. Data lines tend to have high impedance terminations, which facilitates induced voltages from coupled radio signals that can change the state of information on a given signal or data line. As such, for example, in a portable two-way radio device located in close proximity to another portable two-way radio device that is transmitting, errors can be induced in display segments, keypad-signals, accessory connector interface, and so on.

A transmitting device can be designed to mitigate near field effects of its own antenna since it knows when it is transmitting, but a separate device doesn't have such information. A common solution is to periodically refresh signal lines. However, as portable devices are battery powered, and given the relatively low frequency of occurrence of radio frequency interference events, periodically waking from a low power mode to refresh signal lines represents a largely inefficient operation.

Accordingly, there is a need for a method and apparatus for maintaining signal states in an electronic device that is subject to occasional radio frequency interference without the problems associated with the prior art.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
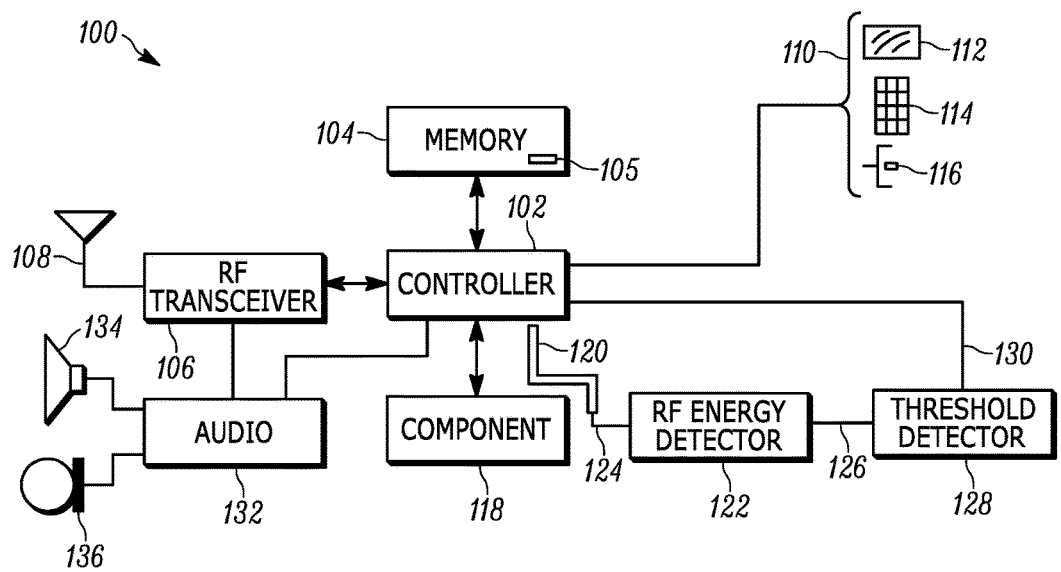
FIG. 1 is a block diagram of a portable two-way radio device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments solve the problems associated with the prior art by detecting radio frequency energy incident on circuitry inside a device while the device is in a low power state, and in response, waking up the device and taking action to mediate the effect of radio frequency interference while a radio frequency energy coupled event is occurring. Embodiments include a circuit for an electronic device that includes an antenna element disposed inside or on the electronic device, and a radio frequency energy detector coupled to the antenna element that provides an output which corresponds to a level of the radio frequency coupled energy received by the antenna element. The circuit further includes a threshold detector coupled to the radio frequency energy detector that asserts an output while the level of radio frequency coupled energy received by the antenna element, as indicated by the output of the radio frequency energy detector, is above a first pre-selected threshold. In some embodiments the threshold detector can use adjustable thresholds. The circuit further includes a controller that is responsive to the output of the threshold detector, and transitions from an inactive state to an active state while the output of the threshold detector is asserted to refresh a component of the electronic device while the output of the threshold detector is asserted.

FIG. 1 is a block diagram of a portable two-way radio device 100 in accordance with some embodiments. The portable two-way radio device 100 is one example of a large number of electronic devices that can experience radio frequency interference (RFI). However, since portable two-way radio devices are often used by personnel working in close proximity, there can be an increased likelihood that the portable two-way radio device 100 will experience RFI at some point by being in sufficiently close proximity to another portable two-way radio device that is transmitting.

Furthermore, being a portable device, the portable two-way radio device 100 is battery powered. To conserve battery charge, the portable two-way radio device 100 will place itself into its lowest power operating mode, or complete sleep mode if possible. Operation of the portable two-way radio device 100 can be managed by a controller 102. The controller 102 is a microprocessor or microcontroller that can execute instruction code as well as interface with various components and subsystems of the portable two-way radio device 100 over various signal lines, such as buses, analog inputs and outputs, interrupts, and other interfaces. For example, the controller 102 is coupled to a memory 104 via a bus. The memory 104 can represent an aggregate memory that includes read only memory (ROM), random access memory (RAM), and can include other types of memory or storage devices. The memory 104 can contain instruction code that is instantiated in RAM during a boot process and subsequently executed by the controller. The instruction code in particular includes code 105 for performing RFI mitigation in accordance with embodiments disclosed here. The controller 102 can be further interfaced with a transceiver 106 that includes radio circuitry for frequency generation, modulation, and demodulation, as well as amplifiers, to perform radio transmission and reception using an antenna 108. An audio processor 132 that is coupled to the transceiver 106 provides audio signals to the transceiver for transmission, and receives audio signals from the transceiver 106 that have been received via radio signals. The audio processor 132 can receive audio signals via a microphone 136, and can play received audio signal over a speaker 134. In some embodiments the audio processor 132 converts received analog audio signals into digital audio signals that are provided to the transceiver 106. Likewise, the transceiver 106 can provide received digital audio signals to the audio processor 132, which converts them to analog audio signals that are played over the speaker 134. The controller can be further interfaced with several user interface components 110, such as, for example, a graphical display 112, a keypad 114 and other buttons/selectors, and an accessory interface 116. The graphical display 112, keypad 114, and accessory connector 116 can each be coupled to the controller 102 via separate, dedicated signal lines or buses. The controller can provide signals representing information to be displayed to the graphical display 112, which can include a video or display controller, as is known. The keypad 114 can provide signals to the controller 102 that indicate which buttons on the keypad 114 are being pressed by a user, as well as the settings of selectors. The accessory connector 116 is a bus that allows external accessories to be connected to the portable two-way radio device 100 for added functionality. During operation, each accessory device connected to the accessory connector 116 is enumerated to facilitate communication between the various accessories and the controller 102. Accessories can include, for example, external audio accessories such as remote microphone/speaker units.

As can be seen, the controller 102 is coupled to several sub-systems, circuits, and devices, including user interface components 110. These components of the portable two-way radio device 100 can be abstracted and represented as component 118, which can be any of the previously recited elements coupled to the controller 102, other elements or sub-systems coupled to the controller 102, or other devices or circuitry not directly coupled to the controller 102 but which can be indirectly controlled by the controller 102 such as, for example, being powered on in an operative state or powered down in a low power but inoperative state by the controller 102. Data and other signal states of elements in the portable two-way radio device 100, such as user interface elements 110, connected accessories, or any other component 118 can be corrupted or altered upon the portable two-way radio device 100 being exposed to RFI. To detect the occurrence of an RFI event, especially while in a low power state, the portable two-way radio device 100 includes one or more antenna elements 120 that are coupled to a radio frequency (RF) energy detector 122 via a connecting line 124. The RF energy detector 122 produces an output 126 that indicates the level of RF energy incident on the antenna 120. The output 126 can be a direct current (DC) voltage that is proportional to the RF energy incident at the antenna 120. The output 126 is provided to a threshold detector 128 that compares the output 126 with one or more threshold levels. When the output 126 exceeds a threshold, the threshold detector 128 provides an output 130 to the controller 102, such as an interrupt that can cause the controller to transition from a low power state to an operational state. Upon transitioning from a low power state to an operational state (i.e. "high" powered state), the controller can determine the source of the interrupt as being from the threshold detector, and invoke instruction code 105 to perform RFI mitigation procedures. The RFI mitigation procedures can be, for example, refreshing the data output to any of the components 118 by the controller, reading data from components 118 (or UI components 110, etc.), re-enumerating accessories connected to the accessory connector 116, enabling components 118 that may have also been powered down, and so on. In some embodiments the controller can continuously refresh data values on signals lines to components 110, 118, or others as long as the output of the threshold detector is asserted. The antenna 120 can be in internal antenna that is located in close proximity to a component 118 or the signal line or lines connected to the component 118. The antenna can be shaped and tuned to correspond to the component and/or the signal lines through testing to determine optimum placement and geometry. An antenna 120 can be located at any of various locations, including on a circuit board (including a flexible circuit board), on an internal portion of a housing of the portable two-way radio device 100, in an accessory connected to the portable two-way radio device 100, on an outside portion of the housing of the portable two-way radio device 100, and so on.

Figure 2:
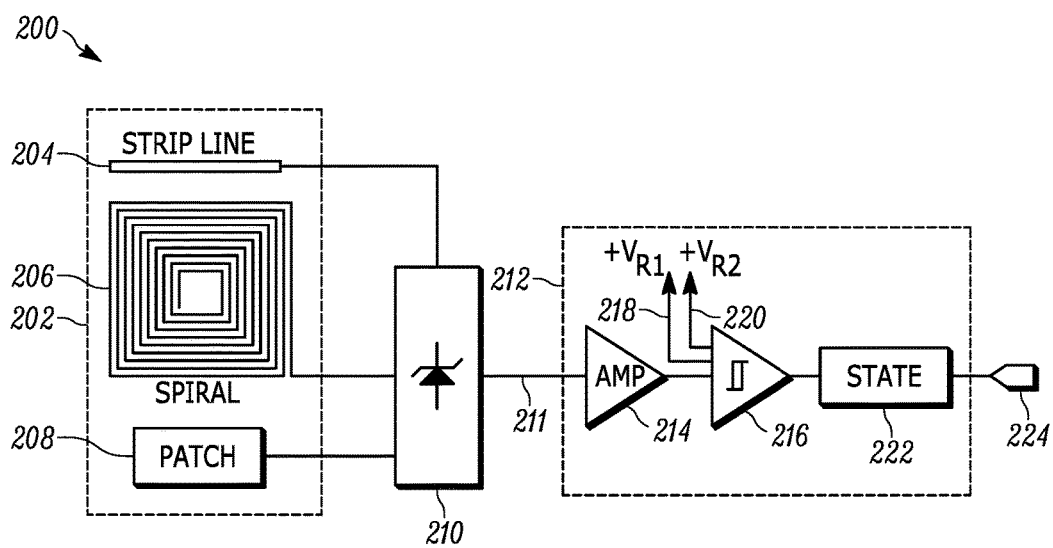
FIG. 2 is a block diagram of a radio frequency energy detector circuit in accordance with some embodiments.

FIG. 2 is a block diagram of a radio frequency energy detector circuit 200 in accordance with some embodiments. The circuit 200 can be used to represent the antenna 120, RF energy detector block 122 and threshold detector block 128 of FIG. 1 in some embodiments. Generally, one or more antennas 202 can be used to receive RF signals by a device while the device is in an inactive or low power mode. Various antenna configurations can be used, such as, for example, a strip line element 204, and spiral element 206, or a patch (or terminated patch) element 208, among numerous other configurations that can be equivalently employed. The antenna 202 is connected to an RF energy detector 210, which in some embodiments can be a simple rectifier circuit. The output 211 of the RF energy detector 210 is provided to a threshold detector 212. The threshold detector can include an amplifier 214 to amplify the output 211 of the RF energy detector 210. The amplifier 214, if present, can provide output to a comparator 216 that compares the output of the amplifier 214 with one or more threshold levels 218, 220. Two different threshold levels can be used for hysteresis, where one threshold level can be provided by a voltage reference, and another can result from using feedback, as is known in comparator circuits. A high threshold level (which can be adjustable depending on the device), e.g. 218, can be used before the output of the comparator 216 changes from a low level to a high level, while a low threshold, e.g. 220, can be used for transitioning from a high level back to a low level, as is known. The output of the comparator 216 is provided to a state machine 222 that can integrate the output of the comparator 216 over time to determine when an actual RFI event is occurring that requires mitigation. The state machine can be implemented in hardware or software, and provides an output 224 that can be provided to an interrupt input of a controller or other supervisory circuit (not shown). Once the output 224 is asserted, the controller will then respond accordingly. In some embodiments where multiple antennas 202 are used, they can be commonly coupled to an RF energy detector 210, or they can each be coupled to a separate, independent RF energy detector 210 and threshold detector 212. In some embodiments multiple antennas 202 can be used to detect RF energy in different frequency bands where a single broadband antenna is not easy to implement. Numerous arrangements and configurations of antennas 202 will occur to those skilled in the art based on specific applications, space restrictions, experimental results, and other design considerations. Likewise, the particular voltage levels of the thresholds 218, 220, and the operation of the state machine 222, can be set as a matter of engineering preference in response to experimental determinations of a level of RFI that results in issues that require mitigation. The particular arrangements and selection of an antenna or antennas 202, amplification factor (214), threshold levels 218, 220, and state machine operation will depend on device design, and the environment in which it is operated.

Figure 3:
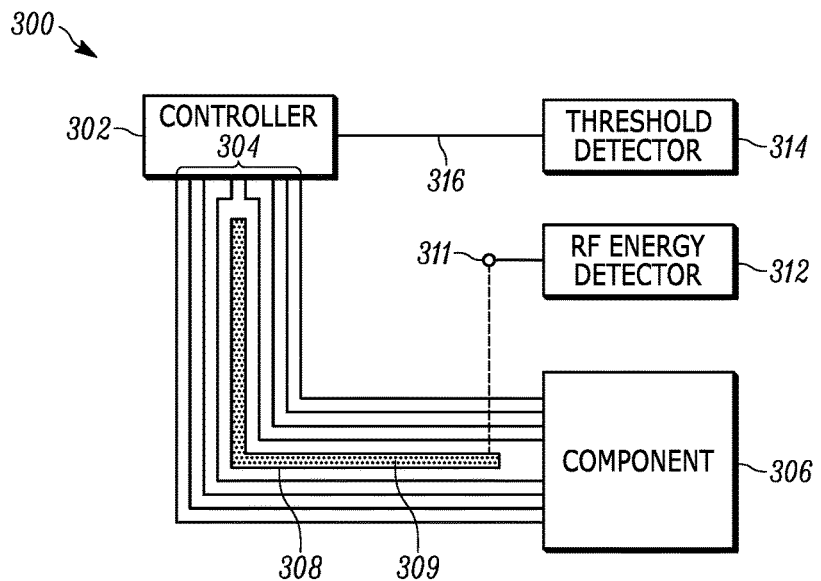
FIG. 3 is a circuit layout diagram in accordance with some embodiments.

FIG. 3 is a diagram of a circuit layout 300 in accordance with some embodiments. The circuit layout 300 can represent the arrangement of a controller 302 and associated component 306 on a circuit board of a portable electronic device. The controller 302 and component 306 can be integrated circuits, each contained in a package with conductive pins that are soldered to conductive pads on the circuit board, as is known. The component 306 can be any of a variety of components that are commonly found in electronic devices, including any components shown and described in reference to FIG. 1. In the present circuit layout the controller 302 is connected to the component 306 by a bus 304, which includes eight conductor runners, each connecting one pin on the controller 302 to a corresponding pin on the component 306. The controller, while active, can transmit data to, or receive data from, the component 306 over the bus 304. Other conductor arrangements can be used, depending on the particular type of circuitry in component 306. Typically the pins connected to signal lines like bus 304 are terminated at each end (i.e. the respective pins at the controller 302 and the component 306) in a high impedance termination. High impedance terminations allow transmission of information using voltage and very little current to conserve power. However, being terminated with high impedance also makes the bus susceptible to RFI which can toggle data states at the controller 302 or component 306. To detect the presence of RFI, a strip line antenna element 308 is disposed in the bus 304. The strip line antenna element 308 can be tuned to have a natural resonance that is substantially similar to that of the bus 304 so that the antenna 308 has the same sensitivity to RFI as the bus 304. The antenna element 308 can be a conductive runner that conforms to the shape and path of the lines of the bus 304. As show here, the antenna element 308 is disposed in the center of the bus 304, but can be located to either side, under, or above the bus 304 as well. The antenna element 308 is connected to a RF energy detector 312 via a conductive runner 310 that can be on a lower level of the circuit layout 300, and connected by printed circuit board vias. As in FIGS. 1 & 2, the RF energy detector 312 produces an output that can be proportional to a level of RF energy incident on the antenna element 308. The output of the RF energy detector 312 is provided to a threshold detector 314 that asserts an output 316 when the RF energy at the antenna element 308, as indicated by the output of the RF energy detector 312, is above a pre-selected threshold. The output 316 is provided to the controller 302. If the output 316 is asserted while the controller 302 is in a low power state, the controller will respond by transitioning to a high power or active state, and respond to the asserted output 316 by, for example, continuously refreshing the data on the bus 304.

Figure 4:
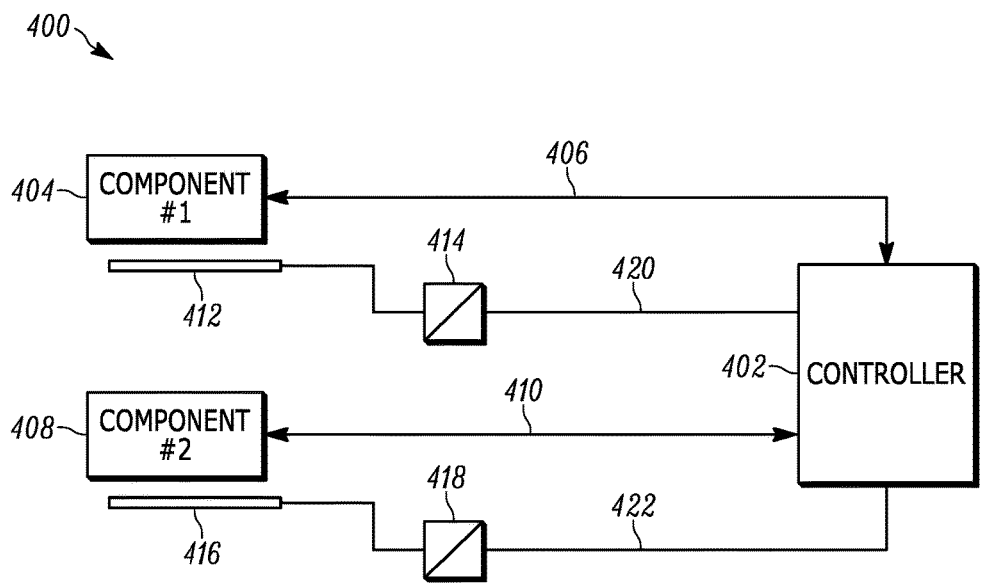
FIG. 4 is a block diagram of a system using multiple radio frequency interference detectors in accordance with an embodiment.

FIG. 4 is a block diagram of a system 400 using multiple RFI detectors 414, 418 in accordance with an embodiment. A controller 402 is coupled to first and second components 404, 408 over signal lines 406, 410, respectively. A first antenna element 412 is located in correspondence with first component 404 and is coupled to a first RFI detector 414. Likewise, a second antenna element 416 is located in correspondence with the second component 408 and is coupled to a second RFI detector 418. Each of the first and second RFI detectors include an RF energy detector and a threshold detector as shown in FIGS. 1-3. Each RFI detector 414, 418 has an output 420, 422, respectively, that is coupled to the controller 402. As shown, the controller 402 can respond to RFI experienced by different components, such as first and second components 404, 408. The first and second components 404, 408 can be located in substantially different locations within an electronic device, on different circuit boards, or simply be susceptible to different frequencies of RFI. In some embodiments, one of the first or second components 404, 408 can be located in a remotely connected accessory that is connected to the electronic device in which the controller 402 is located. Upon either of the outputs 420, 422 being asserted, the controller can respond accordingly by transitioning from a low power state to an active state, and perform an appropriate mitigation action such as, for example, refreshing signals on the corresponding one of lines 406, 410, or performing the mitigation on both lines 406, 410 even when only one of outputs 420, 422 are asserted. Thus, multiple components in an electronic device can be protected from RFI independently, or jointly. It will be appreciated by those skilled in the art that a controller such as controller 402 is not necessarily a microcontroller or microprocessor. Rather, it can be a buffer or other circuit that responds to the output of the threshold detector and commences an RFI mitigation process in response to the output.

Figure 5:
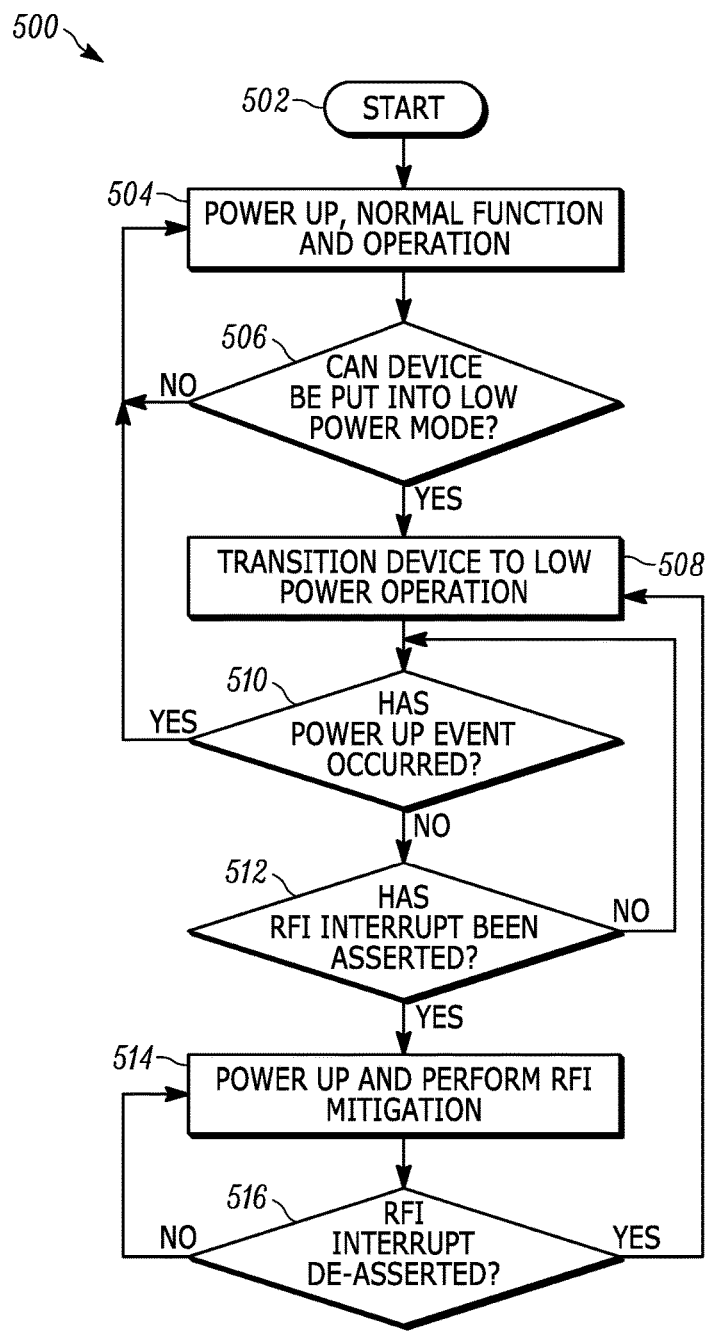
FIG. 5 is a flow chart diagram of a method of mitigating radio frequency interference in a device in accordance with some embodiments.

FIG. 5 is a flow chart diagram of a method 500 of mitigating radio frequency interference in a device in accordance with some embodiments. At the start 502 the device is operable and ready to be powered up or turned on for use. The device can be any battery powered electronic device that is susceptible to signal or data corruption, or any other undesirable effect of RFI, and that conserves power or battery charge by going into a low power or sleep state during times of inactivity. In some embodiments the method 500 can be performed by a portable two-way radio device. In step 504 the device is powered up and commences normal functions and operation. While operating normally, the device can periodically or occasionally determine if it can transition from the active state to an inactive state as in step 506. If conditions allow the device to transition to the low power state, then the device does so in step 508, otherwise, the device remains in the operational state in step 504. In step 508 the device shuts down various components in the device and its controller or controllers can enter a low power state where execution of instruction code is suspended. While in the low power state, circumstances can change that require the device to transition to the full power state, thus, in step 510, the controller and/or other components can periodically wake up and determine whether there is any action that needs to be taken. Other events that could cause the device to wake up and transition back to step 504 are the detection of an incoming transmission intended for the device or a button on the device being pressed or actuated by a user, that generates a wake up interrupt. Alternatively to the conventional "wake up" events occurring, the method also determines if an RFI event is being experienced by the device by having the RFI interrupt being asserted in step 512. The RFI interrupt indicates that a circuit, such as that shown in FIG. 2, has detected RF energy in at least a portion of the device that could affect signal states, or other circuit operation while the device is in a low power state. In response, according to the method 500, the device transitions from the low power mode to an active, or otherwise operational mode in step 514 to perform RFI mitigation, such as re-asserting signals on signal lines or issuing a refresh command to the affected component(s), causing them to refresh one or more other components in response. Furthermore, the RFI mitigation can include issuing a user-perceptible alert to indicate to a user of the device that the device is experiencing RFI, allow the user to move or re-position the device with respect to any potential source of the RFI. According to step 516, the mitigation can be ongoing until the RFI has ceased, whereupon the method 500 de-asserts the RFI interrupt and reverts to step 508, where the device can resume low power mode.

Accordingly, the embodiments provide the benefit of detecting occurrence of an RFI event while the device is in a low power state such that the device does not need to periodically wake and refresh signal states on the assumption that RFI may be present. As a result, the device will avoid the energy use associated with conventional approaches by only waking up the device when RFI is actually being experienced, which will likely be only a fraction of the time, if at all, compared to periodically waking up the device as done under the conventional approach. Furthermore, the RFI can be localized such that it affects only certain components in the device, and as a result, mitigation measures only need be taken with regard to the affected component in some embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A circuit for a portable electronic device, comprising:
   an antenna element disposed inside the electronic device;
   a radio frequency energy detector coupled to the antenna element that provides an output which corresponds to a level of radio frequency coupled energy received by the antenna element;
   a threshold detector coupled to the radio frequency energy detector that asserts an output while the level of radio frequency coupled energy received by the antenna element, as indicated by the output of the radio frequency energy detector, is above a first pre-selected threshold indicating exposure of the portable electronic device to radio frequency interference (RFI), and wherein the RFI is known to corrupt or alter data signal states of a component of the portable electronic device; and
   a controller that is responsive to the output of the threshold detector, and transitions from an inactive state to an active state to perform RFI mitigation wherein the output of the threshold detector is asserted to refresh the component of the electronic device while the output of the threshold detector is asserted, and the controller transitions back to the inactive state upon completion of the RFI mitigation, thereby ensuring that the component is protected from the exposure of the portable electronic device to the RFI, while also conserving battery power to the portable electronic device.

2. The circuit of claim 1, wherein the controller continuously refreshes the component while the output of the threshold detector is asserted.

3. The circuit of claim 1, wherein the threshold detector de-asserts the output of the threshold detector upon the level of radio frequency coupled energy received by the antenna element falling below a second pre-selected threshold, and wherein the controller transitions from the active state to the inactive state upon the output of the threshold detector being de-asserted.

4. The circuit of claim 1, wherein the first pre-selected threshold is adjustable.

5. The circuit of claim 1, wherein the controller refreshes the component by reading from the component.

6. The circuit of claim 1, wherein the controller refreshes the component by writing to the component.

7. The circuit of claim 1, further comprising a user-perceptible alert responsive to the output of the threshold detector being asserted.

8. The circuit of claim 7, wherein the user-perceptible alert indicates that the user to move or re-position the device with respect to a potential source of the RFI.

9. The circuit of claim 1, wherein the output of the threshold detector is provided to an interrupt line of the controller.

10. The circuit of claim 1, wherein the controller refreshes the component by issuing a refresh command to the component.

11. The circuit of claim 1, wherein the electronic device transitions from the active state to the low power state in response to energy being detected which is indicative of the RFI falling below a second pre-selected threshold.

12. The circuit of claim 1, wherein the component comprises a user interface component, and the electronic device comprises a portable radio.

13. The circuit of claim 1, wherein the component being refreshed as part of the RFI mitigation is a user interface component comprising at least one: a display, a keypad, and an accessory connector and respective display signals, keypad signals and accessory connector signals associated therewith.

14. The circuit of claim 1, wherein refresh of the component as part of RF mitigation is not periodic.

15. The circuit of claim 1, wherein pins connected to signal lines of the component are terminated at each end of the controller and the component in a high impedance termination, thereby making the signal lines susceptible to RFI.

16. A method of mitigating radio frequency interference (RFI) in a portable battery powered device, comprising:
   detecting, while the portable battery powered device is in a low power state, incidence of RFI at a user interface component of the battery powered device, and wherein the RFI is known to corrupt or alter data signal states of a user interface component of the portable battery powered device;
   responsive to detecting the incidence of the RFI, transitioning the portable battery powered device from the low power state to an active state;
   responsive to transitioning from the low power state to the active state, performing RFI mitigation by the device on the user interface component; and
   responsive to completing the RFI mitigation, transitioning the portable battery powered device from the active state back to the low power state, thereby ensuring the user interface component is protected from the exposure of the portable electronic device to the incidence of RFI, while also conserving battery power to the portable battery powered device.

17. The method of claim 16, wherein the device performs the RFI mitigation until the incidence of the RFI is no longer detected, whereupon the device transitions back to the low power state.

18. The method of claim 16, wherein detecting incidence of RFI comprises:
   receiving RF energy at an antenna in the device that is in close proximity to at least one signal line of the device;
   producing an output by an RF energy detector that is coupled to the antenna, wherein the output has a level that corresponds to a level of the RF energy;
   comparing the output of the RF energy detector to a first pre-selected threshold at a threshold detector of the device; and
   asserting an RFI interrupt by the threshold detector when the output of the RF energy detector exceeds the first pre-selected output, wherein asserting the RFI interrupt causes a controller of the device to perform the RFI mitigation.

19. The method of claim 16, wherein performing the RFI mitigation comprises refreshing a signal state on at least one signal line in the device.

20. The method of claim 19, wherein refreshing the signal state is performed continuously while the incidence of RFI is detected, and ceased upon the incidence of RFI ceasing to be detected.

21. The method of claim 16, further comprising:
determining that the incidence of RFI has ceased; and
transitioning the device from the active state to the low power state.

22. The method of claim 16, wherein the battery powered device comprises a portable radio.

23. The method of claim 16, wherein the user interface component of the portable battery powered device comprises at least one of: a display, a keypad, and an accessory connector and respective display signals, keypad signals and accessory connector signals associated therewith.

24. The method of claim 16, wherein the refresh of the user interface component is not periodic.

25. The method of claim 16, wherein pins connected to signal lines of the user interface component are terminated at each end of the controller and the user interface component in a high impedance termination, thereby making the signal lines susceptible to RFI.

26. A portable two-way radio device, comprising:
a controller that has a low power mode and an active mode;
at least one component that is coupled to the controller, wherein each component is coupled to the controller by at least one signal line;
at least one antenna element disposed inside the portable two-way radio device;
a radio frequency energy detector coupled to the at least one antenna element that provides an output which corresponds to a level of radio frequency coupled energy incident at the antenna element; and
a threshold detector coupled to the radio frequency energy detector that asserts an output while the level of radio frequency coupled energy received by the antenna element, as indicated by the output of the radio frequency energy detector, is above a first pre-selected threshold indicating exposure of the portable two-way radio device to radio frequency interference (RFI), and wherein the RFI is known to corrupt or alter data signal states of at least one component of the portable electronic device;
wherein the controller, responsive to the output of the threshold detector, transitions from the low power mode to the active mode to perform radio frequency interference (RFI) mitigation wherein the output of the threshold detector is asserted to refresh at least one of the at least one component while the output of the threshold detector is asserted, and the controller transitions back to the low power mode upon completion of the RFI mitigation, thereby ensuring that the at least one component is protected from the exposure of the portable electronic device to the RFI, while also conserving battery power of the portable two-way radio.

27. The portable two-way radio device of claim 26, wherein the at least one antenna element is located in proximity to a signal line coupling the controller to the at least one component.

28. The portable two-way radio device of claim 26, wherein the at least one antenna element includes a first antenna element and a second antenna element, wherein the first and second antenna elements are located in different locations within the portable two-way radio device.

29. The portable two-way radio device of claim 26, wherein the controller refreshes the at least one component continuously while the output of the threshold detector is asserted.

30. The portable two-way radio device of claim 26, wherein the controller refreshes the at least one component by writing to the at least one component.

31. The portable two-way radio device of claim 26, wherein the RFI mitigation further comprises issuing a user-perceptible alert to indicate to a user of the device that the device is experiencing RFI.

32. The portable two-way radio device of claim 31, wherein the user-perceptible alert indicates to the user to move or re-position the device with respect to a potential source of the RFI.

33. The portable two-way radio device of claim 26, wherein the component comprises a user interface component.

34. The portable two-way radio device of claim 26, wherein the at least one component being refreshed as part of the RFI mitigation comprises a user interface component comprising at least one of: a display, a keypad, and accessory connector and respective display signals, keypad signals and accessory connector signals associated therewith.

35. The portable two-way radio device of claim 26, wherein the refresh of the at least one component as part of the RFI mitigation is not periodic.

36. The portable two-way radio device of claim 26, wherein pins connected to signal lines of the at least one component are terminated at each end of the controller and the at least one component in a high impedance termination, thereby making the signal lines susceptible to RFI.

* * * * *